(12) United States Patent
Steinberg

(10) Patent No.: US 7,580,833 B2
(45) Date of Patent: Aug. 25, 2009

(54) CONSTANT PITCH VARIABLE SPEED AUDIO DECODING

(75) Inventor: Daniel Steinberg, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 789 days.

(21) Appl. No.: 11/221,455

(22) Filed: Sep. 7, 2005

(65) Prior Publication Data

US 2007/0055397 A1    Mar. 8, 2007

(51) Int. Cl.
*G06F 17/00* (2006.01)

(52) U.S. Cl. ...................................... 704/218
(58) Field of Classification Search .................. 704/218
See application file for complete search history.

(56) References Cited

U.S. PATENT DOCUMENTS

| | | | |
|---|---|---|---|
| 5,386,493 A | | 1/1995 | Degen et al. |
| 5,774,837 A | * | 6/1998 | Yeldener et al. ............ 704/208 |
| 5,828,995 A | * | 10/1998 | Satyamurti et al. ......... 358/1.18 |
| 6,351,730 B2 | * | 2/2002 | Chen ........................... 704/229 |
| 6,636,830 B1 | * | 10/2003 | Princen et al. ............... 704/204 |
| 6,944,510 B1 | * | 9/2005 | Ballesty et al. ................ 700/94 |
| 7,088,831 B2 | * | 8/2006 | Rosca et al. .................... 381/92 |

OTHER PUBLICATIONS

S. Roucos and A. Wilgus, High quality time-scale modification for speech. In Proceedings of the IEEE International Conference on Acoustics, Speech, and Signal Processing, pp. 493-496. IEEE. 1985.

\* cited by examiner

*Primary Examiner*—Susan McFadden
(74) *Attorney, Agent, or Firm*—Fish & Richardson P.C.

(57) ABSTRACT

A digital audio signal can be processed to have a constant pitch for a range of playback rates. A playback rate associated with a portion of the digital audio signal can be received, which differs from the rate at which the digital audio signal was recorded. A channel of the digital audio signal can be divided into a plurality of windows and one or more cross-correlation evaluations can be performed for at least a first window and a second window of the channel to determine an appropriate overlap. Further, the first cross-correlation evaluation can be performed using an ideal overlap. One or more sample values associated with a first waveform included in the first window can be averaged with one or more corresponding sample values associated with a second waveform included in the second window for the determined appropriate overlap to generate a rate-modified audio signal, which can be played.

35 Claims, 7 Drawing Sheets

CONSTANT PITCH VARIABLE SPEED AUDIO DECODING

BACKGROUND

The present disclosure relates to audio playback devices and systems, and to audio playback algorithms employed in conjunction with such devices.

Audio information can be detected as an analog signal and can be represented using an infinite number of electrical signal values. An analog audio signal is subject to electrical signal impairments, however, that can negatively affect the quality of the recorded information. For example, any change to an analog signal value can result in a defect that will be noticeable when the audio signal is played back, such as distortion and noise. Moreover, because an analog audio signal can be represented using an infinite number of electrical signal values, it is difficult to detect and correct defects, such as those that occur during transmission. Many of the problems associated with the use of analog audio signals can be overcome, without a significant loss of information, simply by digitizing the audio signals.

FIG. 1 presents a portion of an analog audio signal 10. The amplitude of the analog audio signal 10 is shown with respect to the vertical axis 12 and the horizontal axis 14 indicates time. In order to digitize the analog audio signal 10, the waveform 16 is sampled at periodic intervals, such as at a first sample point 18 and a second sample point 20. A sample value representing the amplitude of the waveform 16 is recorded for each sample point. The waveform 16 must be sampled at an appropriate rate to avoid losing information that is needed to represent the analog audio signal 10 with adequate precision. As such, the waveform 16 must be sampled at a rate that is greater than twice the highest frequency present in the analog audio signal 10, which is known as the Nyquist frequency.

The human ear generally cannot detect frequencies greater than 16-20 kHz, so the sampling rate used to create an accurate representation of an acoustic signal should be at least 32 kHz. For example, compact disc quality audio signals are generated using a sampling rate of 44.1 kHz. Once the sample value associated with a sample point has been determined, it is then represented using a fixed number of binary digits. Encoding the infinite possible values of an analog audio signal using a finite number of binary digits will almost necessarily result in the loss of some information. Because high-quality audio is encoded using up to 24-bits per sample, however, the digitized values closely approximate the analog values. The digitized values of the samples comprising the audio signal are then stored electronically using a digital-audio file format.

The acceptance of digital-audio has increased dramatically as the amount of information that is shared electronically has grown. Digital-audio file formats, such as MP3 (MPEG Audio-layer 3) and WAV, that can be transferred between a wide variety of hardware devices are now widely used. In addition to music and soundtracks associated with video information, digital-audio is also being used to store information such as voice-mail messages, audio books, speeches, lectures, and instructions.

The characteristics of digital-audio and the associated file formats also can be used to provide greater functionality in manipulating audio signals than was previously available with analog formats. For example, exact duplicates of a digital-audio file can be produced almost instantaneously. Further, any point in a digital-audio signal can be randomly accessed during playback, permitting the implementation of functions such as seek and random play.

It is also much easier to process digital information and thus to manipulate one or more characteristics associated with a digital audio signal. For example, an audio signal is associated with a first rate when it is recorded. This rate can be represented numerically as 1.0. The audio signal, however, can be played back at a second rate that is faster than the first rate. The faster rate can be represented using a number with a higher value, such as 1.1. The audio signal also can be played back at a third rate that is slower than the first rate and can be represented using a number with a lower value, such as 0.9. Playback at a rate other than the first rate is referred to as rate modified playback.

If an audio signal is not processed appropriately, rate modified playback can affect the pitch of the audio signal and thereby make its content less intelligible. For example, if an audio signal is simply played back at a faster rate, the pitch of the audio signal can increase. Conversely, if an audio signal is simply played back at a slower rate, the pitch of the audio signal can decrease. With proper processing, however, it is possible to perform rate modified playback at a rate-invariant, or constant, pitch. During rate modified playback at a constant pitch, the pitch of the rate modified audio signal will be perceived by a listener to be substantially similar to the pitch of the audio signal played back at the first rate. Therefore, the intelligibility of the audio signal can be retained across a variety of playback rates.

One general method for performing rate modified playback of a digital audio signal containing speech is known as time-scale modification (TSM). In TSM, the spectral envelope and the pitch of an unmodified digital audio signal are measured at a plurality of discrete time points. A digital audio signal is then synthesized such that it has approximately the same spectral envelope and pitch at the corresponding time points when played back at the desired modified rate. In order to synthesize the rate modified digital audio signal, an initial estimate is first chosen and then iteratively refined to approach the required spectral envelope and pitch. Depending upon the quality of the initial estimate, fifty to one hundred iterations could be required to achieve an acceptable sound quality. As a result of the iterative processing used to develop the synthesized digital audio signal, the TSM approach is computationally intense.

SUMMARY

The present inventor recognized the value of implementing strategies that, among other things, would permit high-quality playback of an audio signal at a constant pitch over variable playback rates, including an audio signal comprised of multiple channels of information. Accordingly, the techniques and apparatus described here implement algorithms for the high-quality playback of an audio signal at a constant pitch over variable rates, including the case where the audio signal comprises multiple channels of audio information.

In general, in one aspect, the techniques can be implemented to include receiving a playback rate associated with a portion of a digital audio signal, wherein the received playback rate differs from a rate at which the digital audio signal was recorded; dividing a channel of the digital audio signal into a plurality of windows, wherein each window includes a waveform; performing one or more cross-correlation evaluations for at least a first window and a second window of the channel to determine an appropriate overlap, wherein the second window immediately succeeds the first window and a first cross-correlation evaluation is performed using an ideal overlap; and averaging one or more sample values associated with a first waveform included in the first window with one or more corresponding sample values associated with a second waveform included in the second window for the determined appropriate overlap to generate a rate-modified audio signal. The techniques further can be implemented such that the rate-modified audio signal provides a constant pitch over a range of playback rates. Additionally, the techniques can be implemented such that the appropriate overlap comprises a best overlap.

The techniques also can be implemented to include dividing a second channel of the digital audio signal into a plurality of windows, wherein each window includes a waveform, and applying the determined appropriate overlap to two corresponding windows of the second channel. The techniques further can be implemented to include associating a cross-fading region with the determined appropriate overlap and averaging the sample values associated with the first waveform and the corresponding sample values associated with the second waveform included in the cross-fading region in accordance with a cross-fading function. Additionally, the techniques can be implemented such that the cross-fading function is non-linear. Further, the techniques can be implemented to include comparing a sign of an amplitude value of a first sample associated with the first window and a sign of an amplitude value of a corresponding second sample associated with the second window; and determining that the first sample and the second sample are correlated if the sign of the amplitude value of the first sample equals the sign of the amplitude value of the second sample.

The techniques also can be implemented such that comparing comprises performing an exclusive-or operation. Further, the techniques can be implemented such that the amplitude value of the first sample is represented as a floating-point number. Additionally, the techniques can be implemented to include calculating a point total for each cross-correlation evaluation and selecting the cross-correlation evaluation with the highest point total as representative of the appropriate overlap.

The techniques also can be implemented to include terminating the one or more cross-correlation evaluations for a pair of windows if the point total for a cross-correlation evaluation represents a perfect score and selecting the cross-correlation evaluation with the perfect score as representative of the appropriate overlap. The techniques further can be implemented to include terminating a cross-correlation evaluation for a pair of windows if the point total for the cross-correlation evaluation must be less than or equal to a point total for a previous cross-correlation evaluation for the pair of windows.

Additionally, the techniques can be implemented to include dividing a second channel of the digital audio signal into a plurality of windows, wherein each window includes a waveform; performing one or more cross-correlation evaluations for at least a first window and a second window of the second channel, wherein the first window and the second window of the second channel correspond to the first window and the second window of the first channel; combining a point total for a cross-correlation evaluation for the first window and second window of the first channel with a point total for a corresponding cross-correlation evaluation for the first window and second window of the second channel to determine an appropriate combined overlap; and averaging, for the first channel and the second channel, one or more sample values associated with a first waveform included in the first window with one or more corresponding sample values associated with a second waveform included in the second window for the determined appropriate combined overlap to generate a rate-modified audio signal.

In general, in another aspect, the techniques can be implemented to include machine-readable instructions for processing a digital audio signal, the machine-readable instructions being operable to perform operations comprising receiving a playback rate associated with a portion of a digital audio signal, wherein the received playback rate differs from a rate at which the digital audio signal was recorded; dividing a channel of the digital audio signal into a plurality of windows, wherein each window includes a waveform; performing one or more cross-correlation evaluations for at least a first window and a second window of the channel to determine an appropriate overlap, wherein the second window immediately succeeds the first window and a first cross-correlation evaluation is performed using an ideal overlap; and averaging one or more sample values associated with a first waveform included in the first window with one or more corresponding sample values associated with a second waveform included in the second window for the determined appropriate overlap to generate a rate-modified audio signal. Further, the techniques can be implemented such that the rate-modified audio signal provides a constant pitch over a range of playback rates. Additionally, the techniques can be implemented such that the appropriate overlap comprises a best overlap.

The techniques also can be implemented to include dividing a second channel of the digital audio signal into a plurality of windows, wherein each window includes a waveform, and applying the determined appropriate overlap to two corresponding windows of the second channel. The techniques further can be implemented to include machine-readable instructions operable to perform operations comprising associating a cross-fading region with the determined appropriate overlap and averaging the sample values associated with the first waveform and the corresponding sample values associated with the second waveform included in the cross-fading region in accordance with a cross-fading function. Additionally, the techniques can be implemented such that the machine-readable instructions are operable to perform operations comprising a non-linear cross-fading function. Further, the techniques can be implemented such that the machine-readable instructions are operable to perform operations comprising dividing the channel into a plurality of windows of equal duration.

The techniques also can be implemented to include machine-readable instructions operable to perform operations comprising comparing a sign of an amplitude value of a first sample associated with the first window and a sign of an amplitude value of a corresponding second sample associated with the second window; and determining that the first sample and the second sample are correlated if the sign of the amplitude value of the first sample equals the sign of the amplitude value of the second sample. The techniques further can be implemented to include machine-readable instructions operable to perform operations comprising calculating a point total for each cross-correlation evaluation and selecting the cross-correlation evaluation with the highest point total as representative of the appropriate overlap. Additionally, the techniques can be implemented to include machine-readable instructions operable to perform operations comprising terminating the one or more cross-correlation evaluations for a pair of windows if the point total for a cross-correlation evaluation represents a perfect score and select the cross-correlation evaluation with the perfect score as representative of the appropriate overlap.

The techniques also can be implemented to include machine-readable instructions operable to perform operations comprising terminating a cross-correlation evaluation for a pair of windows if the point total for the cross-correlation evaluation must be less than or equal to a point total for a previous cross-correlation evaluation for the pair of windows. The techniques further can be implemented to include machine-readable instructions operable to perform operations comprising dividing a second channel of the digital audio signal into a plurality of windows, wherein each window includes a waveform; performing one or more cross-correlation evaluations for at least a first window and a second window of the second channel, wherein the first window and the second window of the second channel correspond to the first window and the second window of the first channel; combining a point total for a cross-correlation evaluation for the first window and second window of the first channel with a point total for a corresponding cross-correlation evaluation for the first window and second window of the second channel to determine an appropriate combined overlap; and averaging, for the first channel and the second channel, one or more sample values associated with a first waveform included in the first window with one or more corresponding sample values associated with a second waveform included in the second window for the determined appropriate combined overlap to generate a rate-modified audio signal.

In general, in another aspect, the techniques can be implemented to include an input that receives, from a user, a playback rate associated with a portion of a digital audio signal, wherein the received playback rate differs from a rate at which the digital audio signal was recorded; and processor electronics configured to divide a channel of the digital audio signal into a plurality of windows, wherein each window includes a waveform; perform one or more cross-correlation evaluations for at least a first window and a second window of the channel to determine an appropriate overlap, wherein the second window immediately succeeds the first window and the first cross-correlation evaluation is performed using an ideal overlap; and average one or more sample values associated with a first waveform included in the first window with one or more corresponding sample values associated with a second waveform included in the second window for the determined appropriate overlap to generate a rate-modified audio signal. Further, the techniques can be implemented such that the rate-modified audio signal provides a constant pitch over a range of playback rates.

The techniques also can be implemented such that the appropriate overlap comprises a best overlap. The techniques further can be implemented such that the processor electronics are further configured to associate a cross-fading region with the determined appropriate overlap; and average the sample values associated with the first waveform and the corresponding sample values associated with the second waveform included in the cross-fading region in accordance with a cross-fading function. Additionally, the techniques can be implemented such that the processor electronics are further configured to divide a second channel of the digital audio signal into a plurality of windows, wherein each window includes a waveform; perform one or more cross-correlation evaluations for at least a first window and a second window of the second channel, wherein the first window and the second window of the second channel correspond to the first window and the second window of the first channel; combine a point total for a cross-correlation evaluation for the first window and second window of the first channel with a point total for a corresponding cross-correlation evaluation for the first window and second window of the second channel to determine an appropriate combined overlap; and average, for the first channel and the second channel, one or more sample values associated with a first waveform included in the first window with one or more corresponding sample values associated with a second waveform included in the second window for the determined appropriate combined overlap to generate a rate-modified audio signal.

In general, in another aspect, the techniques can be implemented to include an input means for receiving, from a user, a playback rate associated with a portion of a digital audio signal, wherein the received playback rate differs from a rate at which the digital audio signal was recorded; and a processor means for dividing a channel of the digital audio signal into a plurality of windows, wherein each window includes a waveform; performing one or more cross-correlation evaluations for at least a first window and a second window of the channel to determine an appropriate overlap, wherein the second window immediately succeeds the first window and the first cross-correlation evaluation is performed using an ideal overlap; and averaging one or more sample values associated with a first waveform included in the first window with one or more corresponding sample values associated with a second waveform included in the second window for the determined appropriate overlap to generate a rate-modified audio signal. Further, the techniques can be implemented such that the rate-modified audio signal provides a constant pitch over a range of playback rates.

The techniques also can be implemented such that the appropriate overlap comprises a best overlap. The techniques further can be implemented to include processor means for associating a cross-fading region with the determined appropriate overlap and averaging the sample values associated with the first waveform and the corresponding sample values associated with the second waveform included in the cross-fading region in accordance with a cross-fading function. Additionally, the techniques can be implemented to include processor means for dividing a second channel of the digital audio signal into a plurality of windows, wherein each window includes a waveform; performing one or more cross-correlation evaluations for at least a first window and a second window of the second channel, wherein the first window and the second window of the second channel correspond to the first window and the second window of the first channel; combining a point total for a cross-correlation evaluation for the first window and second window of the first channel with a point total for a corresponding cross-correlation evaluation for the first window and second window of the second channel to determine an appropriate combined overlap; and averaging, for the first channel and the second channel, one or more sample values associated with a first waveform included in the first window with one or more corresponding sample values associated with a second waveform included in the second window for the determined best combined overlap to generate a rate-modified audio signal.

The techniques described in this specification can be implemented to realize one or more of the following advantages. For example, the techniques can be implemented to permit selecting the best cross-correlation between two windows that most closely approximates the ideal overlap, which is determined in accordance with the specified playback rate. The techniques also can be implemented to permit selecting the best cross-correlation between adjoining windows of an audio signal that is comprised of multiple channels of information. Additionally, the techniques can be implemented to include signal processing, such as cross-fading, to further reduce signal impairments resulting from overlapping and averaging. The techniques also can be implemented such that a cross-correlation is efficiently performed utilizing a small number of computing cycles, for both integer and floating-point representations of audio samples.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

DETAILED DESCRIPTION

Figure 1:
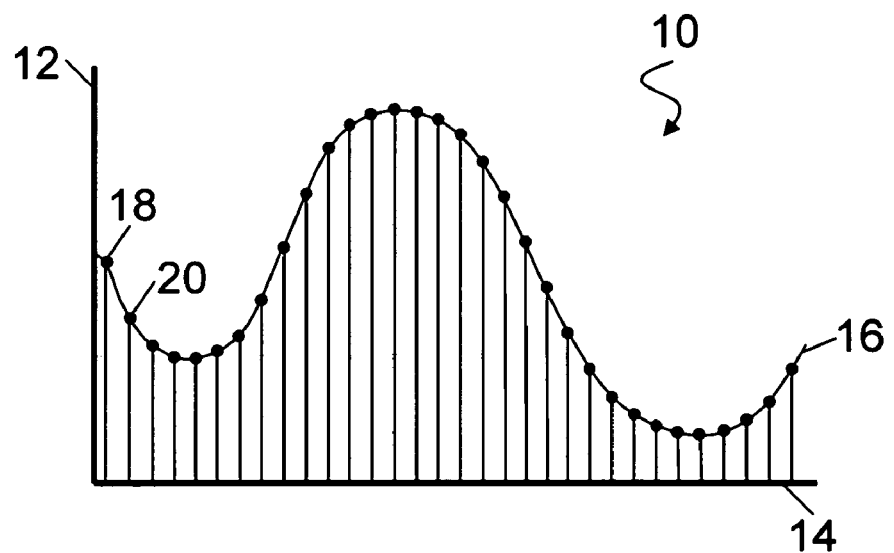
FIG. 1 presents an analog waveform.
Figure 2:
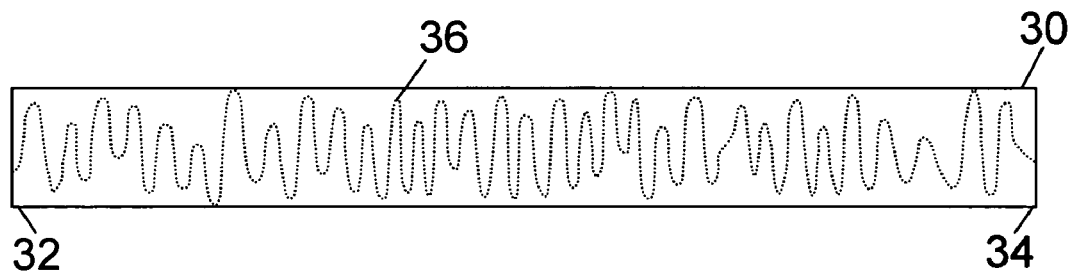
FIGS. 2-3 are diagrams of an audio signal.

A modified synchronized overlap-and-add (SOLA) algorithm can be used to process a digital audio signal to have a constant pitch for a range of playback rates. In performing the modified SOLA algorithm, it is possible to cross-correlate successive windows of a digital audio signal based on the characteristics of the waveform contained in those windows. A digital audio signal 30, such as a portion of an audio file, is shown in FIG. 2. A start time 32 and an end time 34 are associated with the digital audio signal 30, and can be used to determine the duration of the digital audio signal 30. As described above, the digital audio signal 30 comprises a waveform 36 that is represented by a plurality of discrete samples, each of which represents an amplitude value. In order to perform rate modified playback at a constant pitch, the digital audio signal 30 must first be divided into a plurality of windows.

Figure 3:
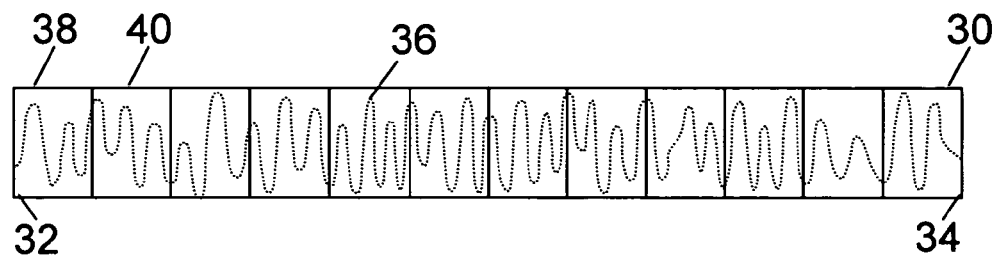

The case in which the digital audio signal 30 is to be played back at a faster rate is presented first. FIG. 3 shows the digital audio signal 30 partitioned into a plurality of windows, each of which is associated with a discrete portion of the waveform 36. In order to simplify the processing requirements, each of the windows can be assigned an equal duration, such as 80 milliseconds (ms). For example, a first window 38 can be defined that corresponds to the first 80 ms of the digital audio signal 30. A second window 40 also can be defined that corresponds to the second 80 ms of the digital audio signal 30. Additionally, if the duration of the final window of the digital audio signal 30 is not exactly 80 ms, one or more zero-value samples can be added to extend the duration to equal exactly 80 ms.

Figure 4:
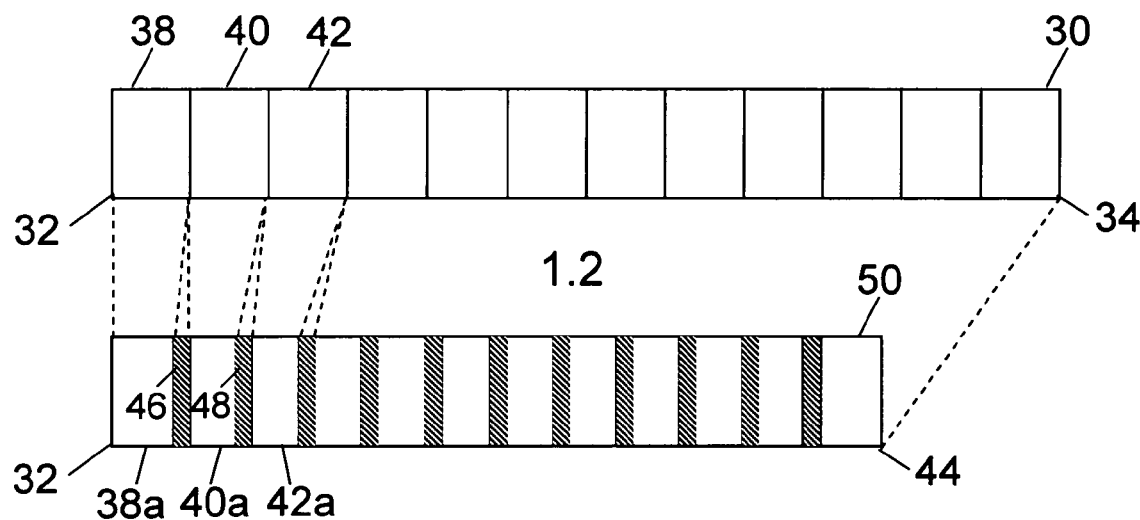
FIG. 4 presents a rate modified audio signal for playback at a faster rate.

Once the digital audio signal 30 has been divided into a plurality of windows, those windows can be cross-correlated to form a reconstructed, rate modified signal. FIG. 4 shows the digital audio signal 30 partitioned into a plurality of equal duration windows, such as the windows 38, 40, and 42. FIG. 4 further shows the cross-correlated windows, such as the windows 38a, 40a, and 42a, which comprise the reconstructed, rate modified signal 50.

The start time 32 associated with the reconstructed, rate modified signal 50 is the same as the start time 32 associated with the digital audio signal 30. Because the specified playback rate is 1.2 times the normal playback speed, however, the end time 44 reflects the reduced duration of the reconstructed, rate modified signal 50. In order to play back the signal associated with all of the windows comprising the digital audio signal 30 in the shortened period, one or more of the windows must be overlapped to some extent. The duration of the ideal overlap between each pair of adjoining windows can be calculated by dividing the amount by which the playback duration of the digital audio signal 30 is shortened by N, where N equals the number of windows−1. Therefore, the ideal overlap represents an even distribution of the reduction in the playback duration over all of the windows included in the digital audio signal 30. For example, if an audio signal is comprised of 11 windows and the playback duration is shortened by 100 ms, each pair of adjoining windows can ideally be overlapped by a period of 10 ms. In this manner, the reconstructed, rate modified signal also will be played back at precisely the specified rate.

In the reconstructed, rate modified signal 50, the first window 38a is shown overlapped with the second window 40a by the ideal duration, which is represented by the ideal overlap region 46. The second window 40a is also shown overlapped with the third window 42a by the ideal duration, which is represented by the ideal overlap region 48. As will be discussed below, however, the ideal duration and the ideal overlap regions do not take into account the waveforms associated with each of the windows and therefore do not represent the best possible cross-correlation, or overlap, between the adjoining windows.

The actual overlap of a window with the adjoining, subsequent window is determined by considering the waveforms associated with the relevant portions of those windows. In performing a cross-correlation evaluation to determine an appropriate overlap between a pair of adjoining windows, the windows can be initially arranged such that the samples associated with the ideal overlap region of the first window and the samples associated with the ideal overlap region of the second window are aligned. This alignment represents the center alignment for the cross-correlation operation performed with respect to that pair of adjoining windows.

The cross-correlation is performed by comparing each pair of corresponding samples associated with the correlation region. For each sample pair, the sample included in the correlation region associated with a first window is compared with the corresponding sample included in a second window. The size of the correlation region can influence the degree of identity obtainable through the cross-correlation operation. Increasing the size of the correlation region, however, also increases the number of comparisons that must be performed. Because fidelity becomes less crucial as the playback rate increases, it is possible to decrease the size of the correlation region in order to decrease the number of comparisons that must be performed.

In performing a cross-correlation evaluation, it is also necessary to specify the criteria used to determine whether a pair of corresponding samples are correlated. A number of different criteria can be utilized, including the signs of the respective amplitude values associated with the samples, the difference in magnitude of the respective amplitude values associated with the samples, or any combination thereof. The correlation criteria also can be modified in accordance with the desired degree of identity.

For example, if the sign of the amplitude value is utilized as the correlation criteria, a pair of corresponding samples are correlated if the sign of the amplitude value associated with the first sample matches the sign of the amplitude value associated with the second sample. The magnitude of the respective amplitude values is not considered. As such, if both samples appear on or above the x-axis, the samples are correlated. Similarly, if both samples appear below the x-axis, the samples are correlated. If, however, one sample appears below the x-axis and the other appears on or above the x-axis, the samples are not correlated. Additionally, a score associated with the alignment can be incremented for each pair of samples that are identified as correlated. Therefore, the result of a cross-correlation operation for a particular alignment can be expressed in terms of a single score associated with that alignment and a plurality of alignments associated with a pair of adjoining windows can be compared using their scores.

In an implementation, the cross-correlation comparison can be performed using a logic function expressed in circuitry or software. For example, the high-order bit representing the sign of the amplitude value associated with a sample included in the correlation region of the first window can be compared with the high-order bit representing the sign of the amplitude value associated with the corresponding sample included in the second window, such as through an exclusive-or operation. Because the digital representation of signed-integer values and Institute of Electrical and Electronics Engineers (IEEE) floating-point values both include the sign associated with the value as the highest-order bit, the exclusive-or operation can be applied to both types of digital representations. Further, the score associated with the alignment can be incremented in accordance with the output from the exclusive-or operation.

Figure 5:
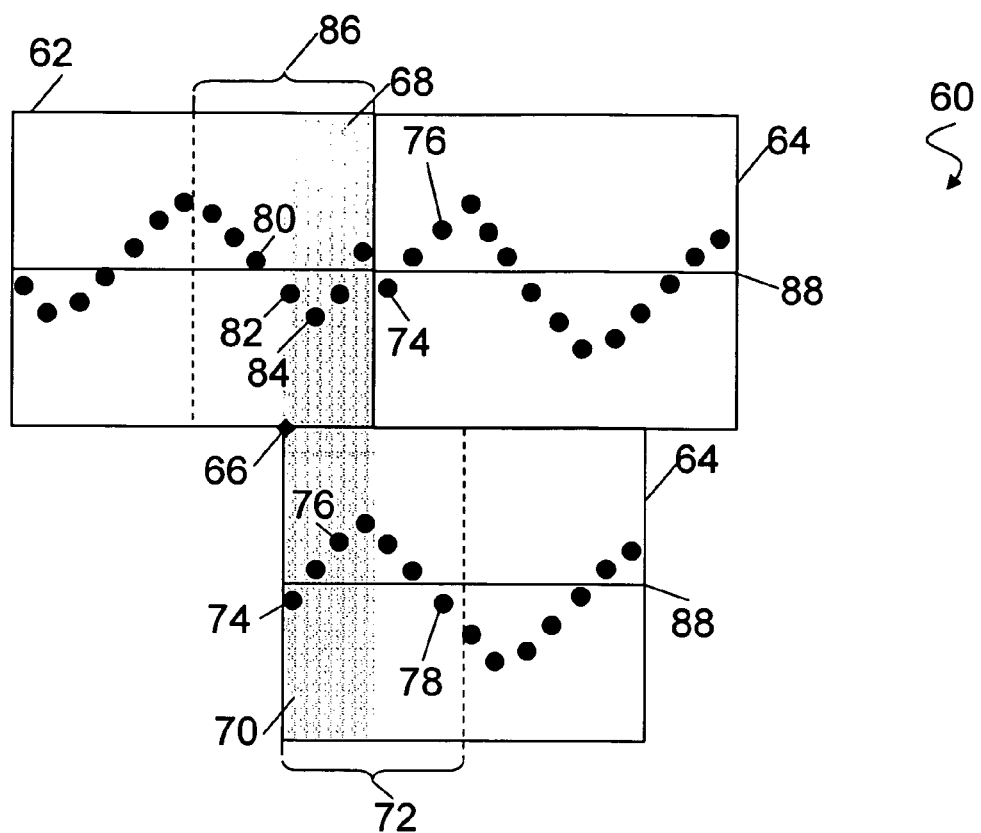
FIG. 5 depicts an alignment of overlapping windows of an audio signal.

A cross-correlation evaluation performed in accordance with the modified SOLA algorithm is described further with respect to FIG. 5, which shows a first window 62 and a second window 64 associated with a digital audio signal 60 that are to be overlapped during a rate modified playback operation. Although the cross-correlation technique is illustrated with respect to spatial alignments, it also can be performed logically. The second window 64 is shown adjoining the first window 62 in its actual, temporal position in the sequence of windows that comprise the digital audio signal 60. Additionally, the second window 64 is shown below the first window 62 such that the samples included in the first and second windows 62 and 64 can be compared. As described above, the initial alignment between the first window 62 and the second window 64 occurs at the ideal insertion point 66, which represents the point at which the ideal overlap region 68 associated with the first window 62 is aligned with the ideal overlap region 70 associated with the second window 64.

The first evaluation to determine the best cross-correlation between the first window 62 and the second window 64 can be performed based upon the ideal overlap. In the first evaluation, the samples included in the correlation region 72 of the second window 64 are compared with the corresponding samples included in the first window 62. The correlation region 72 represents the region of the second window 64 for which each cross-correlation evaluation is performed and also indicates the maximum amount by which the second window 64 can be overlapped with the first window 62. Because the correlation region of the second window 64 extends beyond the end of the first window 62, additional corresponding samples from the digital audio signal 60 are used to complete the cross-correlation comparison.

For example, the first sample 74 included in the correlation region 72 of the second window 64 is compared with the corresponding sample 82 included in the first window 62. Because both of the samples 74 and 82 occur below the x-axis 88, the samples 74 and 82 are correlated and the score for this alignment is incremented by one. Similarly, in the final comparison for this alignment, the last sample 78 included in the correlation region 72 of the second window 64 is compared with the third sample 76 included in the portion of the digital audio signal 60 that extends beyond the end of the first window 62. In accordance with the division of the windows, the third sample 76 is temporally associated with the second window 64. Because the samples 78 and 76 occur on opposite sides of the x-axis 88, the samples 78 and 76 are not correlated and the score for the alignment is not incremented based on the comparison. Each of the intervening corresponding sample pairs can be similarly evaluated to derive the score associated with the first alignment.

Once the first alignment has been evaluated, the second window 64 can be shifted with respect to the first window 62 to produce a different alignment. A candidate overlap region 86 associated with the first window 62 indicates the maximum amount by which the first window 62 can be overlapped with the second window 64. In order to evaluate each of the possible alignments between the first and second windows 62 and 64, as permitted by the candidate overlap region 86, the second window 64 can be shifted in either direction from the ideal insertion point 66.

For example, the second window 64 can be shifted to the left by one sample to produce a second alignment. In the resulting second alignment, the first sample 74 included in the second window 64 corresponds to the sample 80 preceding the ideal overlap region 68 of the first window 62. After the cross-correlation evaluation has been performed for the second alignment, a third alignment, which is also one sample removed from the ideal insertion point 66, can be produced by shifting the second window 64 to the right by two samples. In the resulting third alignment, the first sample 74 associated with the second window 64 corresponds to the sample 84 included in the first window 62. The shifting process can be repeated, working outward from the center alignment, until every possible alignment of the first window 62 and the second window 64 that falls within the candidate overlap region 86 has been evaluated. Further, in accordance with this sequence, each of the possible alignments will be evaluated in order of proximity to the center alignment. Therefore, if an alignment associated with a perfect score is identified, the remaining alignments that have not been evaluated can be ignored, as no other alignment that is closer to the center alignment can be identified that will result in a perfect score.

In an implementation, unnecessary cross-correlation computations also can be eliminated even though an alignment that produces a perfect score has not been identified. The cross-correlation computations for a given alignment of a pair of adjoining windows can be aborted once it is determined that the score for that alignment cannot exceed the best score currently associated with an alignment of the pair of adjoining windows. For example, if the current best score associated with an alignment of a pair of adjoining windows indicates that all but three corresponding sample pairs match, then the evaluation of each subsequent alignment for that pair of adjoining windows can be aborted as soon as the number of non-matching corresponding sample pairs is determined to exceed two. Because each subsequent alignment is further removed from the center alignment, only an alignment that is associated with a score higher than the current best score will be selected.

In another implementation, one or more additional comparisons can be performed before terminating the cross-correlation evaluation for a pair of adjoining windows. For example, if an alignment that is shifted two samples from the ideal insertion point is determined to produce a perfect score, the complementary alignment that is shifted two samples from the ideal insertion point in the opposite direction also can be evaluated before the cross-correlation evaluation is terminated. If it is determined that both alignments produce a perfect score, an additional selection criteria can be used to select between the alignments. For example, the alignment that results in the greatest amount of overlap between the windows can be selected.

Figure 6:
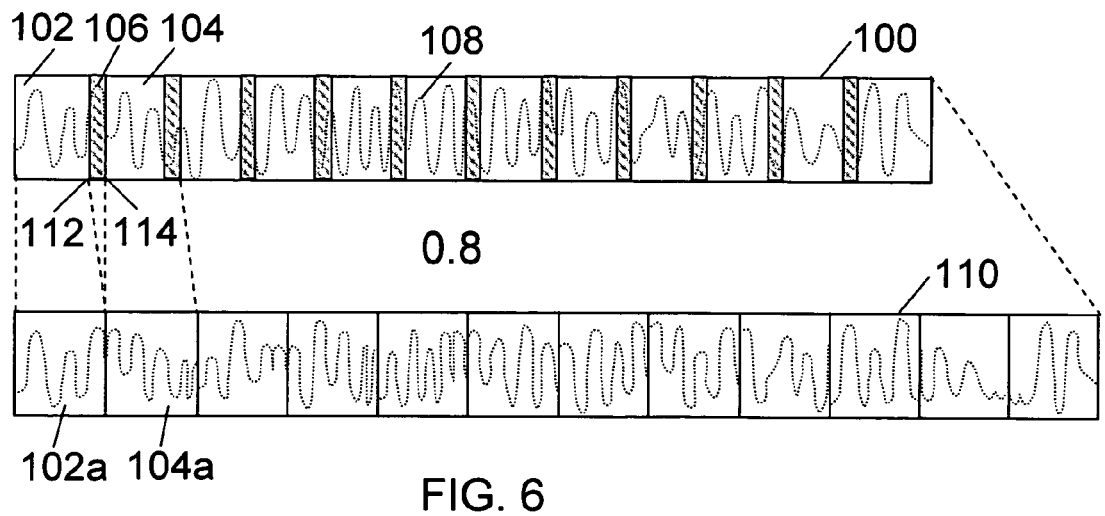
FIG. 6 presents a rate modified audio signal for playback at a slower rate.

If the specified playback rate for the digital audio signal is slower than the rate at which it was recorded, a similar process can be performed to identify the best cross-correlation between each pair of adjoining windows that comprise the signal. The technique for partitioning the digital audio signal into windows, however, is performed differently. FIG. 6 presents a digital audio signal 100 that is divided into a plurality of windows, including a first window 102 and a second window 104. As discussed above, each of the windows can be of the same duration in order to simplify the processing required for rate modified playback.

The digital audio signal 100 is to be played back at a rate of 0.8, so the playback duration will be longer than the duration of digital audio signal 100 as recorded. Therefore, when the digital audio signal 100 is divided into a plurality of windows, the windows are initially overlapped to account for the extended playback duration. The amount by which each pair of adjoining windows is overlapped is determined in accordance with the duration by which playback is extended. As similarly described above, the ideal overlap 106 for each pair of adjoining windows can be calculated by dividing the total increase in the playback duration by N, where N equals the number of windows−1. In this case, the ideal overlap represents an even distribution of the increase in the playback duration across all of the windows included in the digital audio signal 100. For example, if an audio signal is comprised of 11 windows and the playback duration is extended by 200 ms, each pair of adjoining windows is ideally overlapped by a period of 20 ms. In this manner, the reconstructed, rate modified signal also will be played back at the specified rate.

When the digital audio signal 100 is divided into a plurality of windows, the single waveform 108 associated with the digital audio signal 100 is also divided. Because the windows comprising the digital audio signal 100 are initially overlapped, such as by the ideal overlap 106 between the first window 102 and the second window 104, a portion of the waveform 108 is associated with both of the overlapping windows 102 and 104. When the reconstructed, rate modified signal 110 is generated, the windows are realigned to eliminate the overlapping regions. Therefore, when the overlapping windows 102 and 104 are separated, the portion of the waveform 108 that was included in the overlapping region appears in each of the separated windows 102a and 104a.

For example, in the digital audio signal 100, the start point 112 associated with the second window 104 precedes the end point 114 of the first window 102 by the amount of the ideal overlap 106. In the reconstructed, rate modified signal 110, the windows are arranged such that the ideal overlap 106 between adjoining windows is eliminated and the end point 114 of the first window 102a adjoins the start point 112 associated with the second window 104a. As such, the portion of the waveform 108 associated with the ideal overlap 106 between the first window 102 and the second window 104 is included both at the end of the first window 102a and the beginning of the second window 104a of the reconstructed, rate modified signal 110.

As described above, the ideal overlap often does not represent the best cross-correlation of the waveform 108 between the first window 102 and the second window 104. Therefore, the cross-correlation evaluation described above also can be performed when the specified playback rate is slower than the rate at which the digital audio signal was recorded. By performing the cross-correlation evaluation, overlaps between adjoining pairs of windows are identified such that the resulting waveform associated with the reconstructed, rate modified signal 110 appears to be continuous.

Figure 7A:
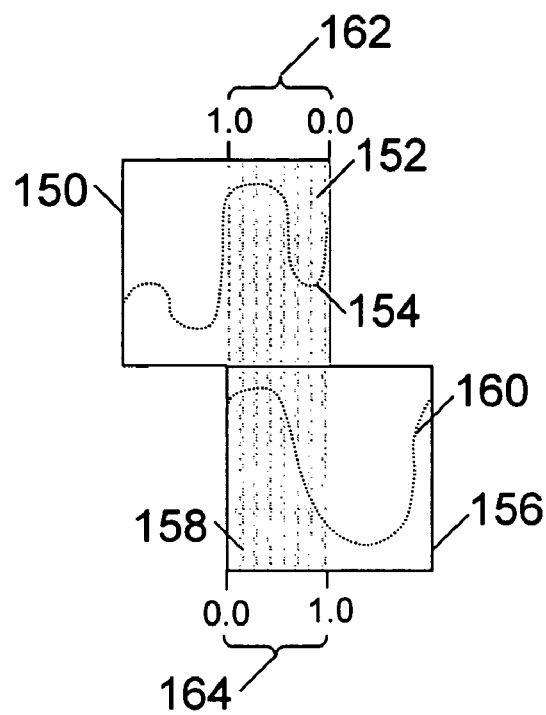
FIGS. 7a, 7b, and 7c show cross-fading functions for an overlapped portion of an audio signal.

The waveforms, or some portion of the waveforms, associated with an overlapped region can be combined through cross-fading rather than simple averaging. FIG. 7a presents a first window 150 and a second window 156 that are to be overlapped. As a result of the overlap, the portion of the first waveform 154 that is included in the overlap region 152 associated with the first window 150 and the portion of the second waveform 160 that is included in the overlap region 158 associated with the second window 156 are to be combined to produce a reconstructed waveform. If the overlapped portions of the first waveform 154 and the second waveform 160 are averaged without additional processing, however, the resulting reconstructed waveform can include one or more sharp transitions. During playback, a sharp transition in a waveform can produce an audible defect.

A cross-fading operation can be used to process the overlapped portions of multiple waveforms, such as the first waveform 154 and the second waveform 160, that are included in a cross-fading region and thereby reduce the likelihood of sudden or sharp transitions in the reconstructed waveform. The cross-fading region can be set to equal the entire overlap between the waveforms. If the size of the cross-fading region is variable, however, the associated weighting factors must be determined based on the number of samples to be averaged. Alternatively, the cross-fading region can be associated with the center of the overlap between the waveforms and can be set to include a fixed number of samples. Therefore, the weighting factors used in the cross-fading operation can be predetermined in order to reduce the associated processing requirements. Additionally, the predetermined weighting factors can be stored, such as in an array, table, or matrix, so that they can be utilized for each cross-fading operation.

A cross-fading operation can be performed by weighting the sample value, or amplitude, associated with each of the corresponding samples that are included in the cross-fading region. In FIG. 7a, the cross-fading region is coextensive with the overlap regions 152 and 158. Therefore, the samples comprising the portion of the first waveform 154 included in the overlap region 152 of the first window 150 can be weighted in accordance with a progressively decreasing scale 162. As such, the first sample in the overlap region 152 is weighted by a factor of 1.0 and the last sample in the overlap region 152 is weighted by a factor of 0.0. Similarly, the intervening samples associated with the first waveform 154 are each weighted by a successively decreasing factor that falls between 1.0 and 0.0.

Conversely, the samples comprising the portion of the second waveform 160 included in the overlap region 158 of the second window 156 are weighted in accordance with a progressively increasing scale 164. Therefore, the first sample in the overlap region 158 is weighted by a factor of 0.0 and the last sample in the overlap region 158 is weighted by a factor of 1.0. Similarly, the intervening samples associated with the second waveform 160 are weighted by a successively increasing factor that falls between 0.0 and 1.0. Once weighted, the corresponding samples can be combined to form the reconstructed waveform. Additionally, when combined, the weighting factors applied to corresponding sample values should equal 1.0. Therefore, the decrease in the weighting factor for a sample associated with the first waveform 154 is directly related to the increase in the weighting factor for a corresponding sample associated with the second waveform 160. As such, the samples associated with the first waveform 154 will most significantly influence the initial portion of the reconstructed waveform and the samples associated with the second waveform 160 will most significantly influence the latter portion of the reconstructed waveform.

Figures 7B, 7C:
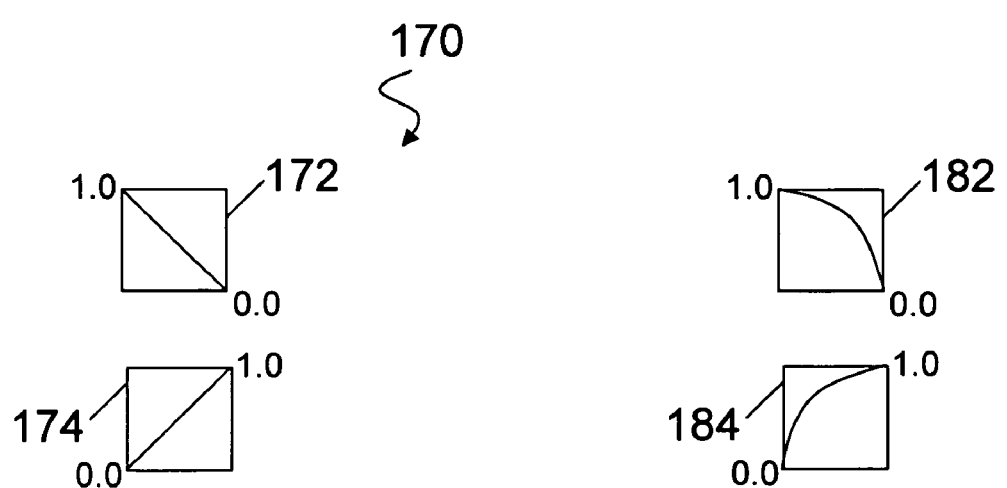

FIG. 7b presents a weighting function 170 in which a first weighting factor 172 decreases linearly from 1.0 to 0.0 while a second weighting factor 174 increases linearly from 0.0 to 1.0. As described above, the weighting function 170 can be used to perform a cross-fading operation on an overlapped portion of a plurality of waveforms. The weighting function does not have to be linear, however. In another implementation, a non-linear weighting function can be used to perform a cross-fading operation. FIG. 7c presents a weighting function 180 in which the first weighting factor 182 decreases from 1.0 to 0.0 in accordance with a constant power-function slope while the second weighting factor 184, which is the inverse of the first weighting factor 182, increases from 0.0 to 1.0 in accordance with the constant power-function slope.

In another implementation, a cross-correlation evaluation also can be performed for an audio signal that is comprised of a plurality of channels, such as stereo or 5.1 Surround Sound. Further, if the channels of a multi-channel audio signal are labeled spatially, such as in 5.1 Surround Sound, it is also possible to restrict the cross-correlation evaluations to a subset of the channels. For example, in order to limit the amount of processing required, cross-correlation evaluations can be performed for only the one or more channels deemed to be important, such as the front left, front right, and front center channels. The resulting cross correlations can then be applied to the remaining channels, such as the surround and subwoofer channels.

Figure 8A:
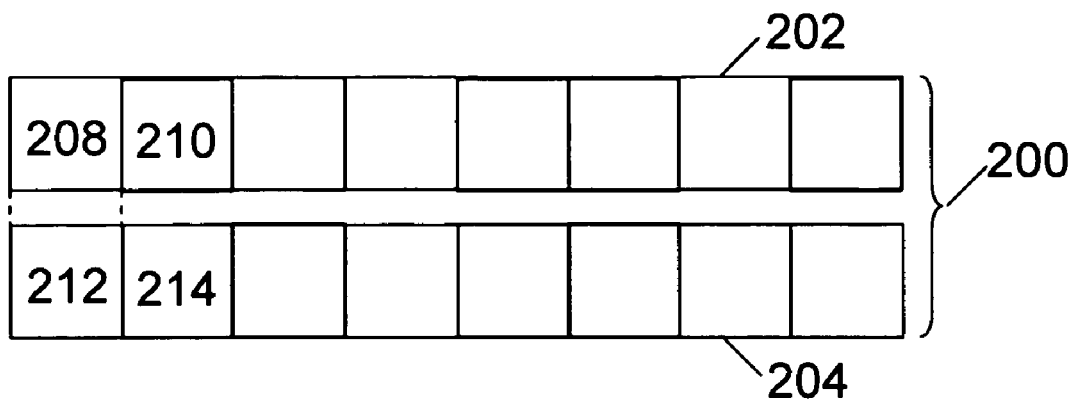
FIGS. 8a and 8b show a cross-correlation evaluation of a multi-channel audio signal.

FIG. 8a presents a digital audio signal 200 that is comprised of two channels of audio information, a first channel 202 and a second channel 204. As described above, the first channel 202 and the second channel 204 are each divided into a plurality of equal duration windows, such that each window associated with the first channel 202 corresponds exactly to a window associated with the second channel 204. For example, the beginning and end of the first window 208 associated with the first channel 202 correspond exactly to the beginning and end of the first window 212 associated with the second channel 204.

In order to play the digital audio signal 200 at a modified rate, such as a rate faster than the rate at which the digital audio signal 200 was recorded, a cross-correlation evaluation is performed for both the windows included in the first channel 202 and the windows included in the second channel 204. As with the techniques described above, an ideal overlap can be calculated based on the specified playback rate and a cross-correlation evaluation can be performed to compare one or more possible alignments. Unlike the techniques described above, however, a cross-correlation evaluation of a pair of adjoining windows is performed with respect to the corresponding windows associated with every channel of the digital audio signal. Therefore, a cross-correlation evaluation for a multi-channel audio signal does not determine the best alignment for a single pair of adjoining windows. Rather, a cross-correlation evaluation for a multi-channel audio signal determines, for each overlap, the best alignment for all of the corresponding pairs of adjoining windows. Therefore, as an alignment between two windows is evaluated for one channel of a digital audio signal, the same alignment is evaluated for the corresponding windows associated with every other channel of the digital audio signal. The result of the cross-correlation evaluations performed for each of the channels are summed to generate a total score for each alignment. The alignment that produces the highest total score represents the best cross-correlation of the corresponding windows for all of the channels taken together and is thus selected. Therefore, the number of phase artifacts in the reconstructed signal can be minimized.

Figure 8B:
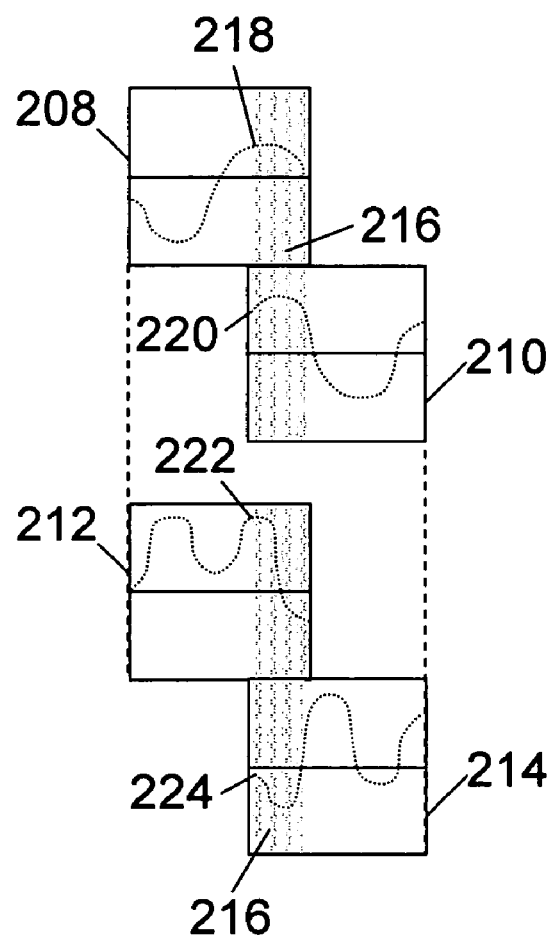

For example, with respect to the digital audio signal 200, the cross-correlation evaluation associated with the overlap of the first window and the second window is performed for both the first channel 202 and the second channel 204. The cross-correlation evaluation can be performed sequentially or simultaneously for each of the channels. As shown in FIG. 8b, the first window 208 and the second window 210 associated with the first channel 202 are initially aligned based on the ideal overlap 216. Additionally, the first window 212 and the second window 214 associated with the second channel 204 are identically aligned based on the ideal overlap 216.

A cross-correlation evaluation can first be performed to evaluate the alignment based on the ideal overlap 216. As described above, the score associated with the alignment for the first channel 202 is only incremented if the corresponding samples are correlated. For example, the sample 218 included in the first window 208 is correlated with the corresponding sample 220 included in the second window 210 because the samples 218 and 220 are both characterized by a positive amplitude value. Therefore, the score for the alignment can be incremented based on that comparison. Similarly, the score associated with the alignment for the second channel 204 is only incremented if the corresponding samples are correlated. For example, the sample 222 included in the third window 212 is not correlated with the corresponding sample 224 included in the fourth window 214 because the samples 222 and 224 are characterized by opposite amplitude values. Therefore, the score for the alignment cannot be incremented based on that comparison.

Once the cross-correlation comparisons for a specific alignment have been completed for each of the channels, the scores for all of the channels are summed to produce a composite score for that alignment. The windows can then be shifted to produce a new alignment. For example, the second window 210 associated with the first channel 202 can be shifted with respect to the first window 208 associated with the first channel 202 by one sample, as described above. When the first and second windows 208 and 210 associated with the first channel 202 are shifted, the first and second windows 212 and 214 associated with the second channel 204 are shifted identically. Cross-correlation evaluations can then be performed for each channel based on the resulting alignment and a composite score also can be generated for the resulting alignment. In this manner, cross-correlation evaluations can be performed on each channel for every possible alignment of the corresponding windows. Once all of the cross-correlation evaluations have been performed, the alignment that produces the best composite score is selected because it represents the best alignment across all of the channels.

Also as described above, a cross-correlation evaluation can be terminated if an alignment results in a perfect composite score, since any equivalent alignment will be further removed from the ideal overlap. In another implementation, unnecessary cross-correlation comparisons also can be eliminated even though an alignment that produces a perfect score has not been identified. The cross-correlation computations for a given alignment can be aborted once it is determined that the composite score for that alignment cannot exceed the best composite score currently associated with an alignment of the corresponding windows.

Figure 9:
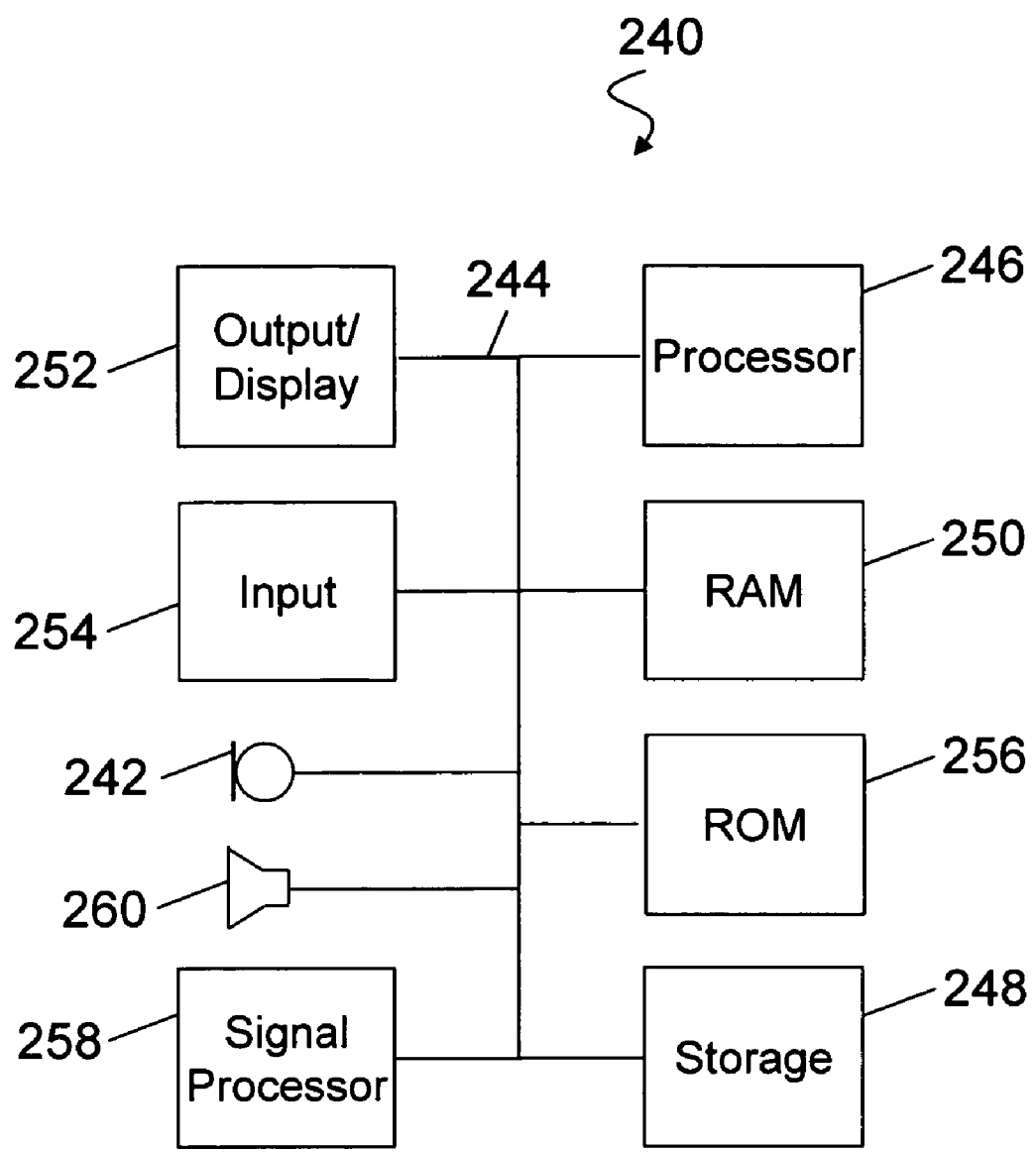
FIG. 9 is a block diagram of a computer system.

FIG. 9 presents a computer system 240 that can be used to implement the techniques described above for processing and playing back a digital audio signal. The computer system 240 includes a microphone 242 for receiving an audio signal. The microphone 242 is coupled to a bus 244 that can be used to transfer the audio signal to one or more additional components. The bus 244 can be comprised of one or more physical busses and permits communication between all of the components included in the computer system 240. A processor 246 can be used to digitize the received audio signal and the resulting digitized audio signal can be transferred to storage 248, such as a hard drive, flash drive, or other readable and writeable medium. Alternately, the digitized audio signal can be stored in a random access memory (RAM) 250.

The digitized audio signals available in the computer system 240 can be displayed along with operations involving the digital audio signals via an output/display device 252, such as a monitor, liquid crystal display panel, printer, or other such output device. An input 254 comprising one or more input devices also can be included to receive instructions and information. For example, the input 254 can include one or more of a mouse, a keyboard, a touch pad, a touch screen, a joystick, a cable interface, and any other such input devices known in the art. Further, audio signals also can be received by the computer system 240 through the input 254. Additionally, a read only memory (ROM) 256 can be included in the computer system 240 for storing information, such as sound processing parameters and instructions.

An audio signal, or any portion thereof, can be processed in the computer system 240 using the processor 246. In addition to digitizing received audio signals, the processor 246 also can be used to perform editing and playback functions, including the rate modified playback techniques described above. Further, the audio signal processing functions, including rate modified playback, also can be performed by a signal processor 258. Thus, the processor 246 and the signal processor 258 can perform any portion of the audio signal processing functions independently or cooperatively. Additionally, the computer system 240 includes an output 260, such as a speaker or an audio interface, through which audio signals can be played back.

Figure 10:
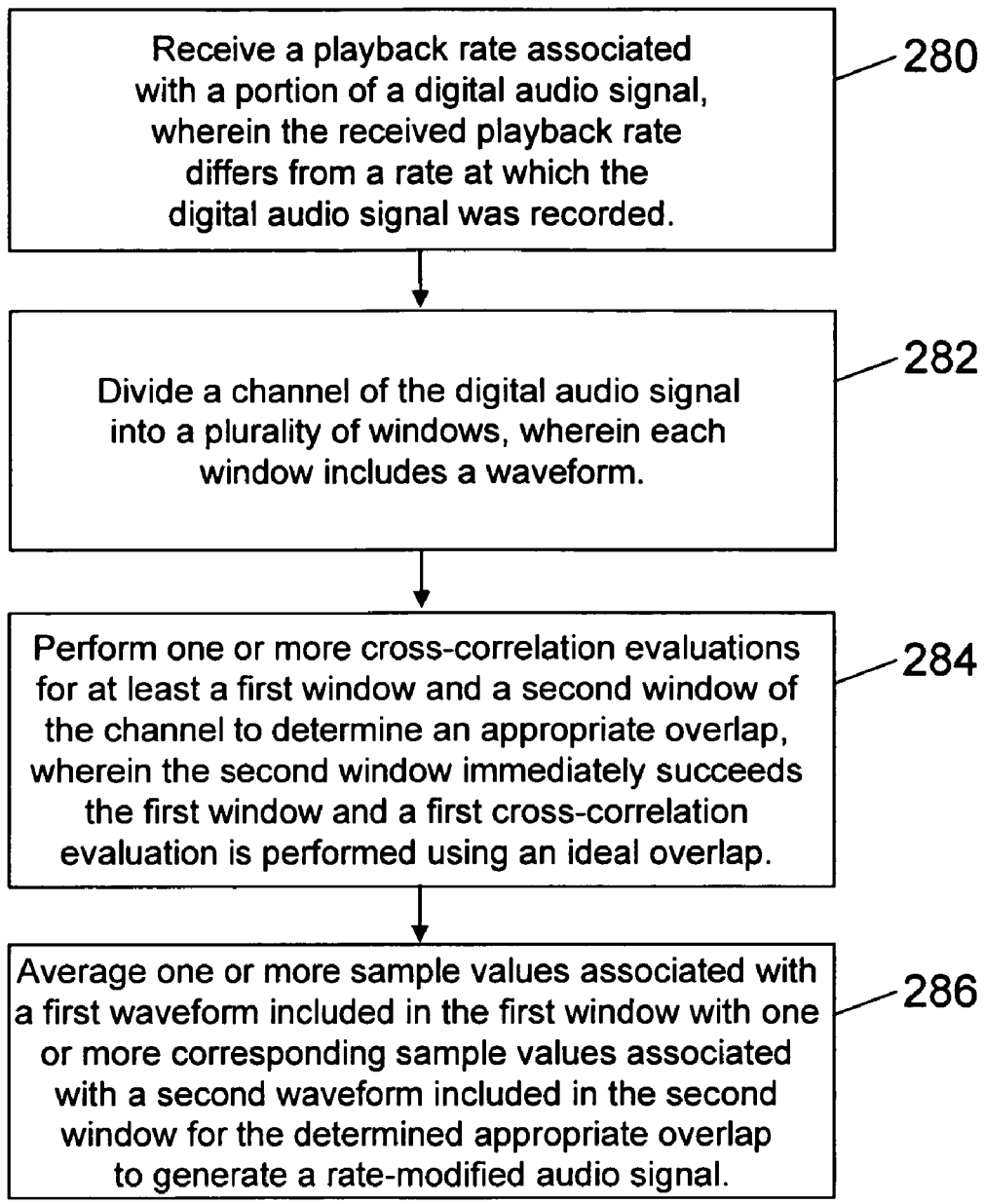
FIG. 10 describes a method of processing a digital audio signal to have a constant pitch for a range of playback rates Like reference symbols indicate like elements throughout the specification and drawings.

FIG. 10 describes a method of processing a digital audio signal to have a constant pitch for a range of playback rates. In a first step 280, a playback rate associated with a portion of a digital audio signal is received, wherein the received playback rate differs from a rate at which the digital audio signal was recorded. In a second step 282, a channel of the digital audio signal is divided into a plurality of windows, wherein each window includes a waveform. In a third step 284, one or more cross-correlation evaluations are performed for at least a first window and a second window of the channel to determine an appropriate overlap, wherein the second window immediately succeeds the first window and a first cross-correlation evaluation is performed using an ideal overlap. Once an appropriate overlap has been determined, the fourth step 286 is to average one or more sample values associated with a first waveform included in the first window with one or more corresponding sample values associated with a second waveform included in the second window for the determined appropriate overlap to generate a rate-modified audio signal.

A number of implementations have been disclosed herein. Nevertheless, it will be understood that various modifications may be made without departing from the spirit and scope of the claims. Accordingly, other implementations are within the scope of the following claims.

What is claimed is:

1. A method of processing a digital audio signal, the method comprising:
   receiving a playback rate associated with a portion of a digital audio signal, wherein the received playback rate differs from a rate at which the digital audio signal was recorded;
   dividing, using a processor, a channel of the digital audio signal into a plurality of windows, wherein each window includes a waveform;
   performing one or more cross-correlation evaluations for at least a first window and a second window of the channel to determine an appropriate overlap, wherein the second window immediately succeeds the first window and a first cross-correlation evaluation is performed using an ideal overlap; and
   averaging, using the processor, one or more sample values associated with a first waveform included in the first window with one or more corresponding sample values associated with a second waveform included in the second window for the determined appropriate overlap to generate a rate-modified audio signal.

2. The method of claim 1, wherein the rate-modified audio signal provides a constant pitch over a range of playback rates.

3. The method of claim 1, wherein the appropriate overlap comprises a best overlap.

4. The method of claim 1, further comprising:
   dividing a second channel of the digital audio signal into a plurality of windows, wherein each window includes a waveform; and
   applying the determined appropriate overlap to two corresponding windows of the second channel.

5. The method of claim 1, wherein averaging further comprises:
   associating a cross-fading region with the determined appropriate overlap; and
   averaging the sample values associated with the first waveform and the corresponding sample values associated with the second waveform included in the cross-fading region in accordance with a cross-fading function.

6. The method of claim 5, wherein the cross-fading function is non-linear.

7. The method of claim 1, wherein performing one or more cross-correlation evaluations further comprises:
   comparing a sign of an amplitude value of a first sample associated with the first window and a sign of an amplitude value of a corresponding second sample associated with the second window; and
   determining that the first sample and the second sample are correlated if the sign of the amplitude value of the first sample equals the sign of the amplitude value of the second sample.

8. The method of claim 7, wherein comparing comprises performing an exclusive-or operation.

9. The method of claim 7, wherein the amplitude value of the first sample is represented as a floating-point number.

10. The method of claim 1, wherein performing one or more cross-correlation evaluations further comprises:
    calculating a point total for each cross-correlation evaluation; and
    selecting the cross-correlation evaluation with the highest point total as representative of the appropriate overlap.

11. The method of claim 10, further comprising:
    terminating the one or more cross-correlation evaluations for a pair of windows if the point total for a cross-correlation evaluation represents a perfect score; and
    selecting the cross-correlation evaluation with the perfect score as representative of the appropriate overlap.

12. The method of claim 10, further comprising:
    terminating a cross-correlation evaluation for a pair of windows if the point total for the cross-correlation evaluation must be less than or equal to a point total for a previous cross-correlation evaluation for the pair of windows.

13. The method of claim 1, further comprising:
    dividing a second channel of the digital audio signal into a plurality of windows, wherein each window includes a waveform;
    performing one or more cross-correlation evaluations for at least a first window and a second window of the second channel, wherein the first window and the second window of the second channel correspond to the first window and the second window of the first channel;
    combining a point total for a cross-correlation evaluation for the first window and second window of the first channel with a point total for a corresponding cross-correlation evaluation for the first window and second window of the second channel to determine an appropriate combined overlap; and
    averaging, for the first channel and the second channel, one or more sample values associated with a first waveform included in the first window with one or more corresponding sample values associated with a second waveform included in the second window for the determined appropriate combined overlap to generate a rate-modified audio signal.

14. A computer program product, tangibly stored on a computer-readable storage medium, comprising machine-readable instructions which cause a computer to perform operations comprising:

receiving a playback rate associated with a portion of a digital audio signal, wherein the received playback rate differs from a rate at which the digital audio signal was recorded;

dividing a channel of the digital audio signal into a plurality of windows, wherein each window includes a waveform;

performing one or more cross-correlation evaluations for at least a first window and a second window of the channel to determine an appropriate overlap, wherein the second window immediately succeeds the first window and a first cross-correlation evaluation is performed using an ideal overlap; and averaging one or more sample values associated with a first waveform included in the first window with one or more corresponding sample values associated with a second waveform included in the second window for the determined appropriate overlap to generate a rate-modified audio signal.

15. The computer program product of claim 14, wherein the rate-modified audio signal provides a constant pitch over a range of playback rates.

16. The computer program product of claim 14, wherein the appropriate overlap comprises a best overlap.

17. The computer program product of claim 14, wherein the machine-readable instructions further cause a computer to perform operations comprising:

dividing a second channel of the digital audio signal into a plurality of windows, wherein each window includes a waveform; and applying the determined appropriate overlap to two corresponding windows of the second channel.

18. The computer program product of claim 14, wherein the machine-readable instructions further cause a computer to perform operations comprising:

associating a cross-fading region with the determined appropriate overlap; and averaging the sample values associated with the first waveform and the corresponding sample values associated with the second waveform included in the cross-fading region in accordance with a cross-fading function.

19. The computer program product of claim 18, wherein the machine-readable instructions further cause a computer to perform operations comprising a non-linear cross-fading function.

20. The computer program product of claim 14, wherein the machine-readable instructions further cause a computer to perform operations comprising dividing the channel into a plurality of windows of equal duration.

21. The computer program product of claim 14, wherein the machine-readable instructions further cause a computer to perform operations comprising:

comparing a sign of an amplitude value of a first sample associated with the first window and a sign of an amplitude value of a corresponding second sample associated with the second window; and determining that the first sample and the second sample are correlated if the sign of the amplitude value of the first sample equals the sign of the amplitude value of the second sample.

22. The computer program product of claim 14, wherein the machine-readable instructions further cause a computer to perform operations comprising:

calculating a point total for each cross-correlation evaluation; and selecting the cross-correlation evaluation with the highest point total as representative of the appropriate overlap.

23. The computer program product of claim 22, wherein the machine-readable instructions further cause a computer to perform operations comprising:

terminating the one or more cross-correlation evaluations for a pair of windows if the point total for a cross-correlation evaluation represents a perfect score; and selecting the cross-correlation evaluation with the perfect score as representative of the appropriate overlap.

24. The computer program product of claim 22, wherein the machine-readable instructions further cause a computer to perform operations comprising:

terminating a cross-correlation evaluation for a pair of windows if the point total for the cross-correlation evaluation must be less than or equal to a point total for a previous cross-correlation evaluation for the pair of windows.

25. The computer program product of claim 14, wherein the machine-readable instructions further cause a computer to perform operations comprising:

dividing a second channel of the digital audio signal into a plurality of windows, wherein each window includes a waveform;

performing one or more cross-correlation evaluations for at least a first window and a second window of the second channel, wherein the first window and the second window of the second channel correspond to the first window and the second window of the first channel;

combining a point total for a cross-correlation evaluation for the first window and second window of the first channel with a point total for a corresponding cross-correlation evaluation for the first window and second window of the second channel to determine an appropriate combined overlap; and averaging, for the first channel and the second channel, one or more sample values associated with a first waveform included in the first window with one or more corresponding sample values associated with a second waveform included in the second window for the determined appropriate combined overlap to generate a rate-modified audio signal.

26. A system for processing a digital audio signal, the system comprising:

an input that receives, from a user, a playback rate associated with a portion of a digital audio signal, wherein the received playback rate differs from a rate at which the digital audio signal was recorded; and processor electronics configured to perform operations comprising:

dividing a channel of the digital audio signal into a plurality of windows, wherein each window includes a waveform;

performing one or more cross-correlation evaluations for at least a first window and a second window of the channel to determine an appropriate overlap, wherein the second window immediately succeeds the first window and the first cross-correlation evaluation is performed using an ideal overlap; and averaging one or more sample values associated with a first waveform included in the first window with one or more corresponding sample values associated with a second waveform included in the second window for the determined appropriate overlap to generate a rate-modified audio signal.

27. The system of claim 26, wherein the rate-modified audio signal provides a constant pitch over a range of playback rates.

28. The system of claim 26, wherein the appropriate overlap comprises a best overlap.

29. The system of claim 26, wherein the processor electronics are further configured to perform operations comprising:
   associating a cross-fading region with the determined appropriate overlap; and
   averaging the sample values associated with the first waveform and the corresponding sample values associated with the second waveform included in the cross-fading region in accordance with a cross-fading function.

30. The system of claim 26, wherein the processor electronics are further configured to perform operations comprising:
   dividing a second channel of the digital audio signal into a plurality of windows, wherein each window includes a waveform;
   performing one or more cross-correlation evaluations for at least a first window and a second window of the second channel, wherein the first window and the second window of the second channel correspond to the first window and the second window of the first channel;
   combining a point total for a cross-correlation evaluation for the first window and second window of the first channel with a point total for a corresponding cross-correlation evaluation for the first window and second window of the second channel to determine an appropriate combined overlap; and
   averaging, for the first channel and the second channel, one or more sample values associated with a first waveform included in the first window with one or more corresponding sample values associated with a second waveform included in the second window for the determined appropriate combined overlap to generate a rate-modified audio signal.

31. A system for processing a digital audio signal, the system comprising:
   an input means for receiving, from a user, a playback rate associated with a portion of a digital audio signal, wherein the received playback rate differs from a rate at which the digital audio signal was recorded; and
   a processing means for performing operations comprising:
      dividing a channel of the digital audio signal into a plurality of windows, wherein each window includes a waveform;
      performing one or more cross-correlation evaluations for at least a first window and a second window of the channel to determine an appropriate overlap, wherein the second window immediately succeeds the first window and the first cross-correlation evaluation is performed using an ideal overlap; and
      averaging one or more sample values associated with a first waveform included in the first window with one or more corresponding sample values associated with a second waveform included in the second window for the determined appropriate overlap to generate a rate-modified audio signal.

32. The system of claim 31, wherein the rate-modified audio signal provides a constant pitch over a range of playback rates.

33. The system of claim 31, wherein the appropriate overlap comprises a best overlap.

34. The system of claim 31, further comprising processing means for performing operations comprising:
   associating a cross-fading region with the determined appropriate overlap; and
   averaging the sample values associated with the first waveform and the corresponding sample values associated with the second waveform included in the cross-fading region in accordance with a cross-fading function.

35. The system of claim 31, further comprising processing means for performing operations comprising:
   dividing a second channel of the digital audio signal into a plurality of windows, wherein each window includes a waveform;
   performing one or more cross-correlation evaluations for at least a first window and a second window of the second channel, wherein the first window and the second window of the second channel correspond to the first window and the second window of the first channel;
   combining a point total for a cross-correlation evaluation for the first window and second window of the first channel with a point total for a corresponding cross-correlation evaluation for the first window and second window of the second channel to determine an appropriate combined overlap; and
   averaging, for the first channel and the second channel, one or more sample values associated with a first waveform included in the first window with one or more corresponding sample values associated with a second waveform included in the second window for the determined appropriate combined overlap to generate a rate-modified audio signal.

* * * * *

UNITED STATES PATENT AND TRADEMARK OFFICE
CERTIFICATE OF CORRECTION

PATENT NO.       : 7,580,833 B2                                      Page 1 of 1
APPLICATION NO.  : 11/221455
DATED            : August 25, 2009
INVENTOR(S)      : Daniel Steinberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Fourteenth Day of September, 2010

David J. Kappos
*Director of the United States Patent and Trademark Office*